US008876100B1

(12) United States Patent  
Herrmann et al.

(10) Patent No.: US 8,876,100 B1  
(45) Date of Patent: Nov. 4, 2014

(54) ROBOTIC BELT FINISHING SYSTEM FOR HIGH SPEED MULTIPLE CARD PICK TO SEQUENCED STACK

(71) Applicant: Xerox Corporation, Norwalk, CT (US)

(72) Inventors: Douglas K. Herrmann, Webster, NY (US); Derek A. Bryl, Webster, NY (US); Paul N. Richards, Fairport, NY (US); Richard Scarlata, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/018,086

(22) Filed: Sep. 4, 2013

(51) Int. Cl.
*B65H 5/00* (2006.01)
*B25J 13/08* (2006.01)

(52) U.S. Cl.
CPC ..................................... *B25J 13/08* (2013.01)
USPC ............... 271/1; 271/292; 271/302; 271/306; 271/280

(58) Field of Classification Search
USPC ............. 271/1, 287, 288, 292, 298, 302, 306, 271/307, 308, 310, 184, 84, 85, 280, 271/282–284; 700/112, 222, 235
See application file for complete search history.

(56) References Cited

U.S. PATENT DOCUMENTS

| 4,697,689 | A | 10/1987 | Carrell |
| 5,314,055 | A | 5/1994 | Gordon |
| 5,896,297 | A | 4/1999 | Valerino, Sr. |
| 6,007,229 | A | 12/1999 | Parnell, Sr. et al. |
| 6,315,513 | B1 | 11/2001 | Harukawa et al. |
| 7,717,255 | B2 | 5/2010 | Scott et al. |
| 2002/0117405 | A1 | 8/2002 | Wang et al. |
| 2007/0157950 | A1 | 7/2007 | Pawlenko et al. |
| 2011/0176895 | A1 | 7/2011 | Kortelainen |
| 2013/0036887 | A1 | 2/2013 | Moore et al. |
| 2013/0041495 | A1 | 2/2013 | Moore et al. |

FOREIGN PATENT DOCUMENTS

EP            1122194           11/2004

*Primary Examiner* — Michael McCullough
(74) *Attorney, Agent, or Firm* — Gibb & Riley, LLC

(57) ABSTRACT

Methods and systems output printed items based on a job of instructions from a printing device; cut the printed items into cut items and output the cut items to a first location based on the job of instructions using a patterning device; and pick the cut items from the first location and place the cut items on a first conveyor based on the job of instructions using a robotic arm. The first conveyor is adjacent the first location. Further, methods and systems transport the cut items to a receiving conveyor based on the job of instructions using the first conveyor. The receiving conveyor is adjacent the first conveyor. Also, methods and systems move the receiving conveyor to position the receiving conveyor to receive specific ones of the cut items in corresponding locations based on the job of instructions.

24 Claims, 4 Drawing Sheets

ROBOTIC BELT FINISHING SYSTEM FOR HIGH SPEED MULTIPLE CARD PICK TO SEQUENCED STACK

BACKGROUND

Systems and methods herein generally relate to automated systems that print, cut, and stack items and more particularly to systems and methods that improve results by providing additional conveyors to make robotic arm movement more efficient.

Complex production devices and systems take raw stock, print on the stock, and cut the stock to produce finished items, such as signage used on store shelves and displays. Such production devices stack the finished output items in specific orders and package such stacks. The sequence of items within such stacks can match any desired order, such as store aisle order (the order in which cards will be attached to store shelves) to allow store workers to have the correct card corresponding to their aisle location within the store when changing signage. Thus, finishing systems can find limitations because of restrictions in item production and stacking sequence requirements.

In one example a robotic system can perform what is called a drop-drop-drop where each of two robots in the same workspace pick three cards at once from a sheet printed 9-up (a sheet cut into 3 by 3 output cards/signs) and then drop the cards in sequence onto a single stack on the output conveyor. However, because the robots are dropping a single item at a time to create a stack of items, even with very fast robots, such robots may not be able to keep pace with the output provided by high-speed printing and patterning devices.

SUMMARY

Exemplary systems herein comprise a central controller processing a job of instructions and a printing device operatively connected to the central controller. The printing device outputs printed items based on the job of instructions. Further, a patterning device is operatively connected to the central controller. The patterning device cuts the printed items into cut items and outputs the cut items to a first location based on the job of instructions.

Also, a robotic element is operatively connected to the central controller. The robotic element picks the cut items from the first location based on the job of instructions. A first conveyor is operatively connected to the central controller. The first conveyor is adjacent the first location. The robotic element places the cut items on the first conveyor based on the job of instructions. The robotic element can comprise multiple robotic elements, and each of the multiple robotic elements can move different sets of the cut items from the first location to the first conveyor.

A receiving conveyor, which can be a flighted conveyor (sometimes referred to herein as a "binned conveyor") is operatively connected to the central controller. The flighted or binned conveyor is adjacent the first conveyor. The binned conveyor can contain partitions defining bins of the binned conveyor. The first conveyor transports the cut items to the binned conveyor based on the job of instructions. The binned conveyor moves to position the bins to receive specific ones of the cut items in corresponding bins based on the job of instructions. Alternatively, the receiving conveyor can be a flat conveyor, without flights or partitions, upon which free-standing stacks of the items are formed when the first conveyor deposits the items on the receiving conveyor.

Other embodiments herein include secondary conveyors positioned at opposite ends of the first conveyor. In these embodiments, the first conveyor alternately moves toward on-loading ends of the secondary conveyors to transport the cut items to the secondary conveyors based on the job of instructions. Further, these embodiments include multiple binned conveyors adjacent offloading ends of the second conveyors. The second conveyors transport the cut items to the binned conveyors based on the job of instructions.

The central controller communicates over a communications network to coordinate actions of such devices. The job of instructions comprises a single unified job, and the job of instructions causes the printing device and the patterning device to produce differently printed and differently sized cut items in a specific order relating to an order in which the items are to be placed in the bins. Thus, the job of instructions (working through the central controller) coordinates the actions of the printing device, the patterning device, the robotic element, the first conveyor, the secondary conveyors (if so equipped) and the binned conveyor(s) to cause the specific ones of the cut items to be delivered to the corresponding bins or stacks in a specific order.

Various methods herein receive a job of instructions into a central controller; output printed items based on the job of instructions from a printing device operatively connected to the central controller; cut the printed items into cut items and output the cut items to a first location based on the job of instructions using a patterning device operatively connected to the central controller; and pick the cut items from the first location and place the cut items on a first conveyor based on the job of instructions using the robotic element. The robotic element can comprise multiple robotic elements, and the process of placing the cut items on the first conveyor can cause each of the multiple robotic elements to move different ones of the cut items from the first location to the first conveyor.

The first conveyor is operatively connected to the central controller, and the first conveyor is adjacent the first location. Further, such methods transport the cut items to a binned conveyor based on the job of instructions using the first conveyor. The binned conveyor is operatively connected to the central controller. The binned conveyor is adjacent the first conveyor, and the binned conveyor contains partitions defining bins of the binned conveyor. Additionally, such methods move the binned conveyor to position the bins to receive specific ones of the cut items in corresponding bins based on the job of instructions.

Other methods herein alternatively move the first conveyor toward on-loading ends of secondary conveyors to transport the cut items to the secondary conveyors based on the job of instructions. Again, the secondary conveyors are positioned at opposite ends of the first conveyor. These alternative methods also transport the cut items to binned conveyors using the second conveyors based on the job of instructions. In these methods, the binned conveyors are adjacent offloading ends of the second conveyors.

These methods communicate over a communications network using the central controller to coordinate actions of the printing device, the patterning device, the robotic element, the first conveyor, and the binned conveyor to cause specific ones of the cut items to be delivered to corresponding bins based on the job of instructions.

The job of instructions comprises a single unified job. Such methods further cause the printing device and the patterning device to produce differently printed and differently sized cut items in a specific order relating to an order in which the items are to be placed in the bins based on the job of instructions.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, even very fast robots may not be able to keep pace with the output provided by high-speed printing and patterning devices. This is especially true for robots that may pick multiple items simultaneously, but that only drop a single item at a time into sorting bins or packaging. In view of this, the systems and methods herein provide a system of conveyor belts that allow the robot to drop multiple items simultaneously (at the same time) in a single motion in the same row order as they are picked from the output belt of the printing/patterning device.

In one example, the output items can be dropped to a transport belt that is perpendicular to the output belt. The transport belt is then actuated to move the output items in a direction perpendicular to the initial process direction. The output items are then transported to a flat receiving belt or to containers or sorting bins, potentially within a "flighted" belt (a binned belt having partitions defining bins) and such a flighted belt may either feed in the process direction or the cross process direction. In other words, items can be stacked in freestanding stacks on the receiving belt or can be stacked in bins or containers of a flighted belt.

A portion of the robotic arm time constraint is based on the system's need to sequence the cards in a particular order. As mentioned above, the cards can be sequenced in, for example, store aisle order and this stacking order is useful for the customer end user process. Without using the perpendicular transport belt, several issues arise when dropping multiple cards simultaneously, because multiple stores could need to be stacked initially, and the stacks need to be rebuilt for any failures, which causes unacceptable waste.

Because the systems and methods herein use a perpendicular transport belt, they have the ability to create stacks for a single store at a time by simultaneously picking a specific number of cards and then simultaneously dropping all picked cards to the perpendicular transport belt to sequence them into a single stack within the bins of the flighted belt. The single line or row of cards can also be shingled in line as an option.

The systems and methods herein allow the robot to work at a nominal rated speed while dramatically increasing the throughput and reliability of the system. Individually dropping each item is very time consuming and this system eliminates the need to perform individual drops to sequence the items. The design shown in the accompanying drawings is capable of doing both the high speed sequencing required for the store cards and also processing lower throughput or larger items to the inline belt system.

Figure 1A:
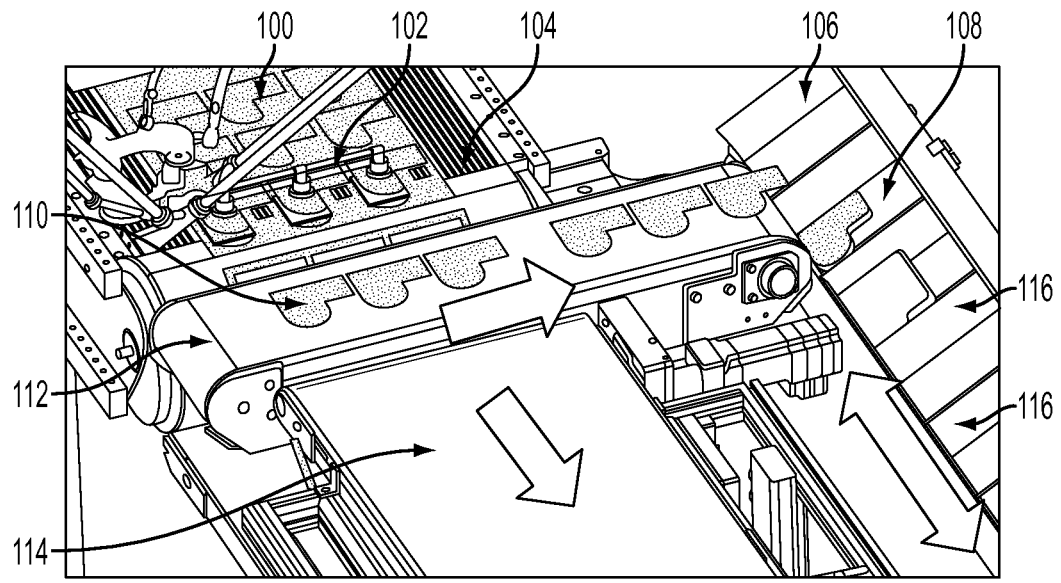
FIG. 1A-1C are schematic diagrams illustrating devices herein.

FIG. 1A is a schematic perspective view illustrating a robot 102 with vacuum grippers acquiring three cards 110 and placing them on the perpendicular vacuum belt 112 to be fed to the in-process flighted conveyor system 106. FIG. 1A also shows the matrix product 100 output by the printing and patterning device(s) on an output vacuum belt 104 from which the individual items 110 are picked. The output vacuum belt 104 moves in the arbitrarily named "processing" direction and the perpendicular transport belt 112 moves in a direction that is non-parallel to the processing direction (such as perpendicular to the processing direction, or some other angle thereto). If items 110 are not picked by the robotic arm 102, they move to a secondary transport belt 114 or scrim belt and are transported away from the output vacuum belt 104.

In FIG. 1A, the perpendicular transport belt 112 allows the robotic arm 102 to drop all three picked items 110 on to the perpendicular transport belt 112 simultaneously. Then, when the perpendicular transport belt 112 moves toward the receiving conveyor 106, the perpendicular transport belt 112 sequentially delivers the items 110 to the bins 108 of the receiving conveyor 106. Such bins 108 are defined by partitions 116 of the receiving conveyor 106. Such partitions can be automatically or manually movable to accommodate different sized items 110.

Alternatively, the receiving conveyor 106 can be a flat conveyor, without flights or partitions, upon which freestanding stacks of the items 110 are formed when the first conveyor 112 deposits the items on the receiving conveyor 106. In one example, the receiving conveyor 106 can be positioned slightly lower (closer to the ground plane) relative to the first conveyor 112, and the receiving conveyor 106 can remain stationary while the first conveyor 112 sequentially moves items 110 onto the receiving conveyor to allow the first conveyor 112 to form freestanding stacks of items in a specific order on the potentially non-flighted receiving conveyor 106.

As shown by the double-arrow, the receiving conveyor 106 can move in two directions, allowing different bins 108 or different locations of the receiving conveyor 106 to be positioned at the delivery end of the perpendicular transport belt 112. This allows coordinated action of the perpendicular transport belt 112 and the receiving conveyor 106 to sort items 110 into different bins 108 as the items 110 drop off the end of the perpendicular transport belt 112 and onto the receiving conveyor 106. This frees the robotic arm 102 from any such sorting, allowing the robotic arm to be used only for simultaneous picking of items from the output belt 104 and simultaneous placing of items on the perpendicular transport belt 112, making the operation of the robotic arm 102 more efficient and allowing the printing/patterning device to run at full speed.

Figure 1B:
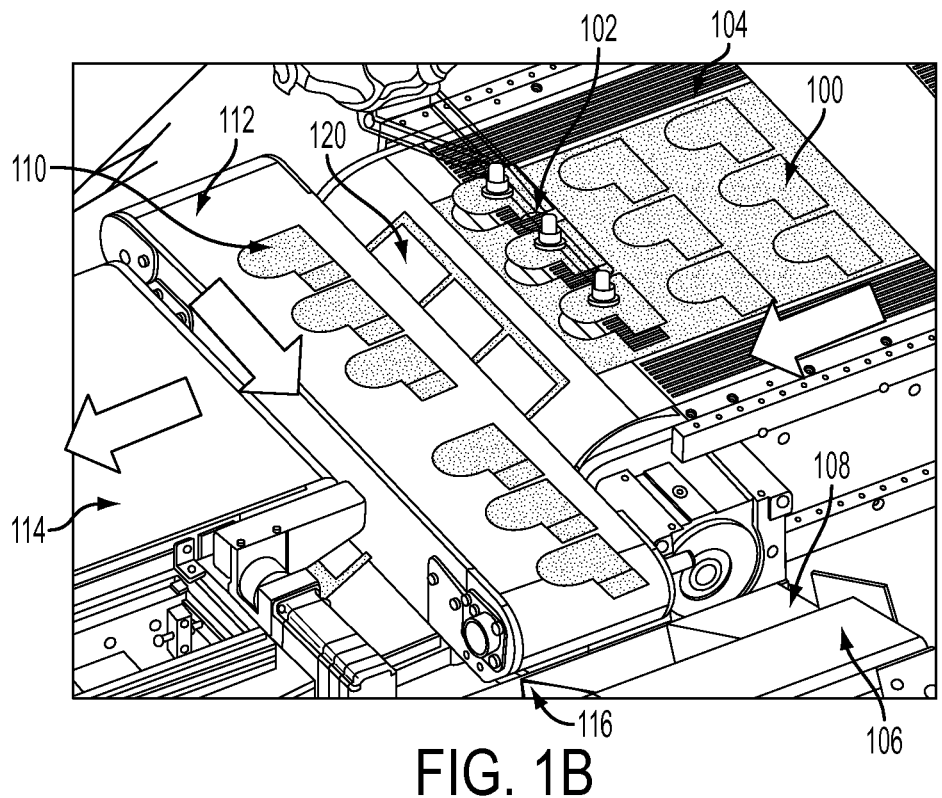
Figure 1C:
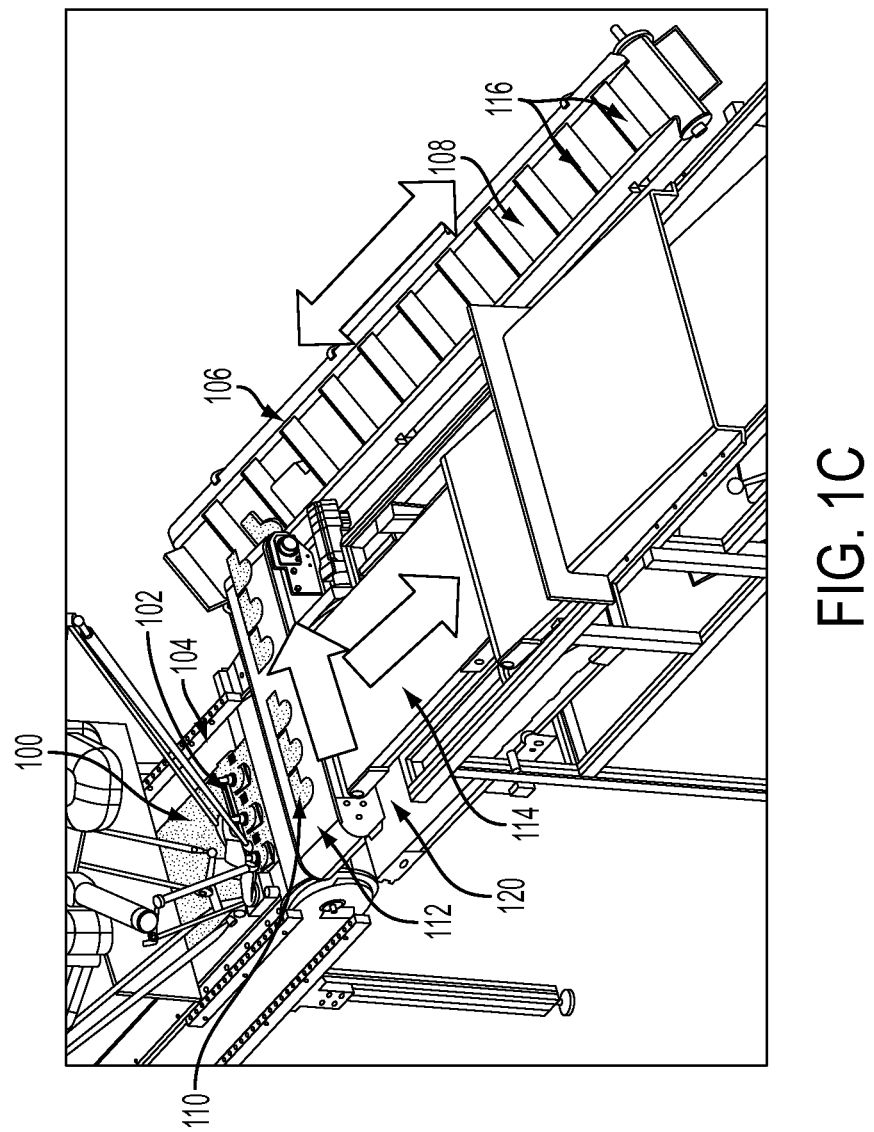

FIG. 1B is a schematic diagram from a different view of the same structure shown in FIG. 1A and shows the system moving the cards 110 from a sheet (matrix layout) 100 to the perpendicular (line layout) on the perpendicular transport belt 112 and then to a stack within a bin 108 of the flighted belt system (point) 106. FIG. 1C similarly illustrates an overall system level view of the robotic belt system as part of the whole system including waste conveyors 120 and all product conveyors 114. Note especially that FIG. 1C illustrates that devices and systems herein are capable of doing both the high speed sequencing required for the store cards using the perpendicular belt 112 and also processing lower throughput or larger items to the inline belt system 104/114.

Figure 2A:
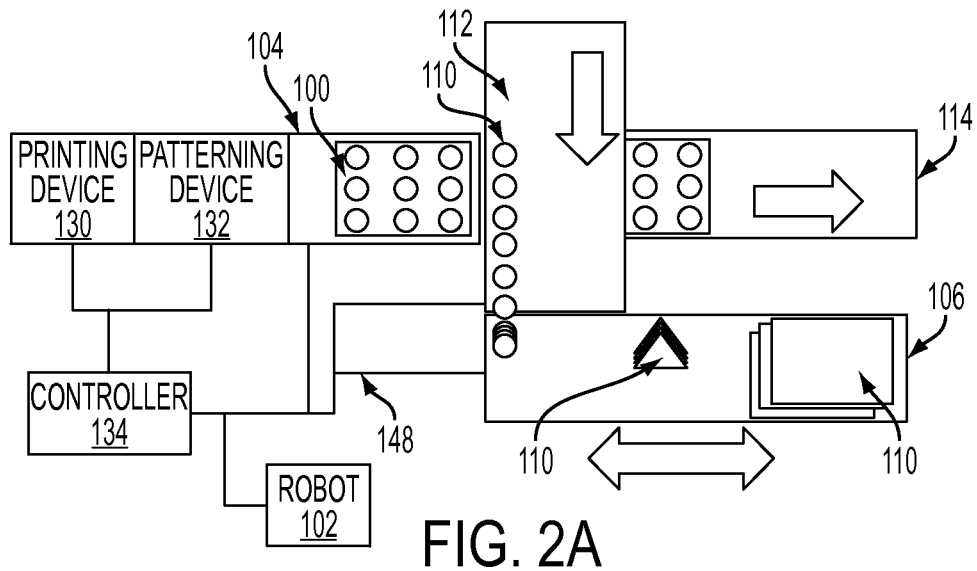
FIG. 2A-2B are schematic diagrams illustrating devices herein.

FIG. 2A is a schematic architecture overview of a system similar to that shown in FIGS. 1A-1C with one optional layout showing printed cards (matrix) 100 to perpendicular belt 112 (Single Row) to final stack receiving conveyor 106 movement. In addition, this schematic view generically illustrates a printing device 130, a patterning device 132, and a controller 134 connected to all belts and devices through a computerized network, the details of which are known to those ordinarily skilled in the art, and are not discussed herein to focus the reader on the salient portions of the structures and methods herein.

Figure 2B:
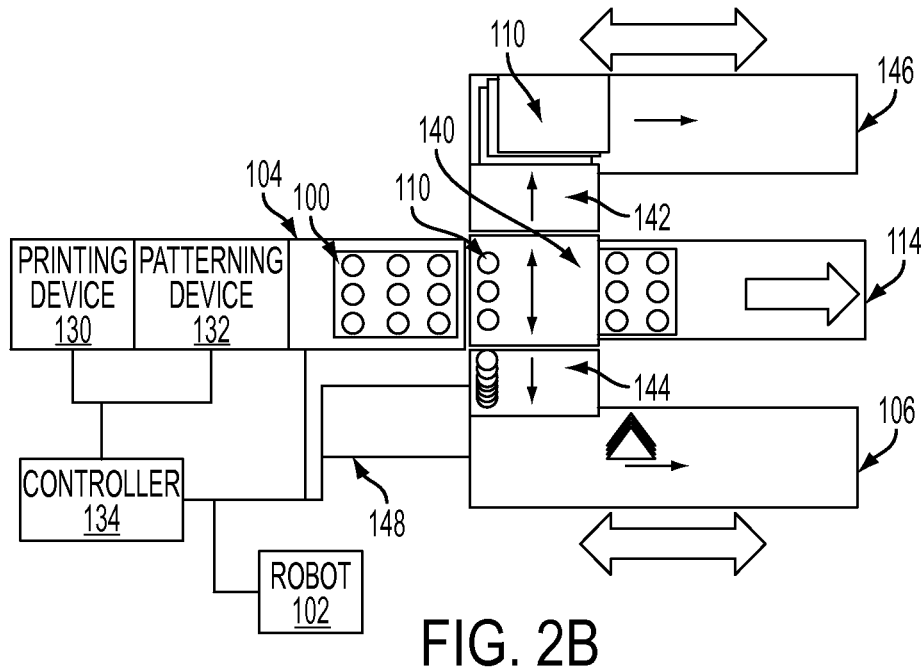

FIG. 2B is also an architecture overview of a different optional layout showing printed cards being fed to an intermediate shingling belt 140 that is also non-parallel to the output belt 104. More specifically, the robotic arm 102 simultaneously drops items 110 on the shingling belt 140 as discussed above with the perpendicular belt 112. However, in the embodiment shown in FIG. 2B, additional secondary conveyors 142 and 144 are placed at the ends of the shingling belt 140. These secondary conveyors 142 and 144 can move at a slower rate (lower speed) than the shingling belt 140 causing the items 110 to be partially overlapped (e.g., shingled) on the secondary conveyors 142 and 144. As noted above, if the secondary conveyors 142 and 144 are stopped while the shingling belt 140 moves and transports items 110, freestanding stacks of items 110 (in a specific order) are formed on the secondary conveyors 142 and 144.

Further, the shingling belt 140 can move in two directions as shown by the double arrow in FIG. 2B allowing the shingling belt 140 to selectively shingle or stack items 110 onto either of the secondary conveyors 142 and 144. This again provides an additional sorting function that does not need to be performed by the robotic arm 102, freeing the robotic arm 102 to only perform simultaneous picking and dropping.

The structure in FIG. 2B also includes an additional receiving conveyor 146, which is similar in structure and function to the receiving conveyor 106, but is placed so that the secondary transport belt 114 is between the two receiving conveyors 106, 146. In operation the items 110 are output by the printing device 130 and the patterning device 132 as a matrix 100. The robot 102 simultaneously picks multiple items 110 from the matrix 100 and simultaneously places the items 110 on the shingling belt 140. The shingling belt 140 moves toward one of the secondary conveyors 142, 144.

If the speeds of the shingling belt 140 and the secondary conveyors 142, 144 are the same, the items 110 are transported from the shingling belt 140 to an on-loading end one of the receiving belts with the same spacing the items 100 had in the matrix 100. However, if the shingling belt 140 is moving faster than the secondary conveyors 142, 144, the spacing of the items 110 on the secondary conveyors 142, 144 is less than the spacing of the items 110 in the matrix 100. Depending upon the speed difference between the shingling belt 140 and the secondary conveyors 142, 144 the items 110 can be stacked or shingled on the secondary conveyors 142, 144 so that the items 110 fully or partially overlap each other on the secondary conveyors 142, 144.

The secondary conveyors 142, 144 move toward the corresponding receiving conveyor 106 or 146. Again, the receiving conveyors 106, 146 can move in either direction to place a corresponding bin or belt location at an offloading end of the secondary conveyors 142, 144. Once again, this provides an additional sorting function that does not need to be performed by the robotic arm 102, freeing the robotic arm 102 to only perform simultaneous picking and dropping, making the operation of the robotic arm more efficient.

Further, FIG. 2B of the application shows another alternative. For example, the rectangles in FIG. 2B represent different and variable sized items that the bins or flights may accommodate. For very large items that may not fit within the bins or containers, the receiving conveyor may not have flights or bins, but may simply be a flat belt upon which items are stacked in freestanding stacks.

Therefore, as shown above, the systems and methods herein place belts at non-parallel angles to one another to create a sequenced stack in concert with variable printing and robotic systems. These provide a system of transport belts used with a robotic interface to move cards/media from a matrix to a line to a point stacking, which allows for sequential stacking in sequential (i.e., store aisle) order. This media handling system combines robotic actuator(s) and end effector picking and placing to a perpendicular vacuum belt to maintain the sequenced order of matrix printed material.

Overall these systems and methods provide for variable printing/cutting/and high speed sequential stacking that is not attainable with a multi-robotic system alone. The disclosed systems and methods are capable of forming sequenced stacks at high speeds, while allowing larger or non-sequential sheets to be passed through in line within the same system. This provides higher speeds and throughput for sequenced stacking from a matrix print, presents lower robotic requirements (fewer robots) and/or lower robotic profile motion speeds, allows for tighter variable print jobs such as ordered supermarket shelf labels, and provides a single system that is capable of handling a variety of jobs that include sequenced, non-sequenced, large signage and other variable printed media that can also be delivered in-line.

Stated in more generic terms, exemplary systems herein comprise a central controller 134 processing a job of instructions. The central controller 134 can comprise any form of computerized processor, the details of which are known to those ordinarily skilled in the art, such as a general processing chip or an application specific integrated circuit (ASIC), a dedicated computer, a portable computing device, a personal computer, a mainframe computer, etc.

A printing device 130 is operatively connected to the central controller 134. The printing device 130 outputs variably printed items (where each item potentially contains unique printing not included on other items) based on the job of instructions. The printing device 130 can be any form of electronic and/or mechanical printing device, the details of which are known to those ordinarily skilled in the art, including offset printers, electrostatic printers, ink-based printers, copiers, multi-function machines, multi-function device (MFD), etc.

Further, a patterning or cutting device 132 is operatively connected to the central controller 134. The patterning device 132 can be integral with, or separate from, the printing device 130. The patterning device 132 can comprise any form of patterning device, the details of which are known to those ordinarily skilled in the art, including a stamping/punching machine, a blade cutting machine, a laser cutting machine, an air knife machine, etc. The patterning device 132 cuts the printed items into cut items 110 and outputs the cut items 110 to a first location 104 based on the job of instructions.

Also, a robotic element 102 is operatively connected to the central controller 134. The robotic element 102 can comprise any form of programmable, computer-controlled, power actuated device capable of picking and placing items, the details of which are known to those ordinarily skilled in the art. In some examples, the robotic element comprises a robotic arm having end effectors comprising suction cups, grasping hooks, electromagnetic pads, adhesive pads, etc. The robotic element 102 can be powered by electronic actuators, pneumatic actuators, hydraulic actuators, electromechanical elements, etc., and can comprise elements made of any material including metals, alloys, plastics, rubbers, etc. The robotic element 102 picks the cut items 110 from the first location 104 based on the job of instructions.

A first conveyor 112 is operatively connected to the central controller 134. The first conveyor 112 is adjacent the first location 104. The first location 104 can be any form of belt, slide, flat surface, and can be, for example, a vacuum belt mounted on driven rollers.

In some examples herein, the first conveyor is described as being perpendicular to the output belt 104; however, those ordinarily skilled in the art would understand that the first conveyor 112 can be placed at any angle or direction relative to the output belt 104 that allows the first conveyor 112 to transport the cut items 110 away from the first location 104. In the examples shown in the accompanying drawings, the first conveyor 112 is perpendicular to the output belt 104 to allow the robotic element 102 to directly place items 110 in a position parallel to the row alignment of the items 110 within the matrix 100, which avoids having the robotic element rotate the position of the end effectors (making the robotic movement more efficient). However, as would be understood by those skilled in the art, any positional arrangement could be used, depending upon the specific installation.

The perpendicular arrangement shown in the drawings is only one example, and the systems herein are not limited to the examples used in the drawings. Thus, the relative angle of the first conveyor 112 can be any angle that allows the robotic element 102 to simultaneously drop multiple cut items 110 and allows such cut items 110 to be transported in any direction away from the first location 104. Note that in these examples, the top surface of the first conveyor 112 is above the surface of the output belt 104 and the secondary belt 114, and is parallel to the rows of items 110 in the matrix 100, which minimizes the distance and rotation that is performed by the robot 102; however, any spacing/location arrangement could be used with such structures, depending upon the specific constraints of each installation of the devices described herein, as would be understood by those ordinarily skilled in the art. Thus, the different conveyors/belts described herein could be parallel to each other, non-parallel to each other, above or below each other, positioned within the same place, etc., all depending upon the specific balance of robotic efficiency and space constraints accommodations of a specific installation.

The robotic element 102 places the cut items 110 on the first conveyor 112 based on the job of instructions. The robotic element 102 can comprise multiple robotic elements 102, and each of the multiple robotic elements 102 moves different ones of the cut items 110 from the first location 104 to the first conveyor 112.

A receiving conveyor 106 is operatively connected to the central controller 134. The receiving conveyor 106 is adjacent the first conveyor 112. The receiving conveyor 106 can contains partitions defining bins 108 of the receiving conveyor 106. The first conveyor 112 transports the cut items 110 to the receiving conveyor 106 based on the job of instructions. The receiving conveyor 106 moves to position the bins 108 or other specific location of the receiving conveyor 106 to receive specific ones of the cut items 110 based on the job of instructions.

Other embodiments herein can include secondary conveyors 142, 144 positioned at opposite ends of the first conveyor 112. In these embodiments, the first conveyor 112 alternately moves toward on-loading ends of the secondary conveyors 142, 144 to transport the cut items 110 to the secondary conveyors 142, 144 based on the job of instructions. Further, these embodiments include multiple receiving conveyors 106, 146 adjacent offloading ends of the second conveyors 142, 144. The second conveyors 142, 144 transport the cut items 110 to the receiving conveyors 106, 146 based on the job of instructions.

The first conveyor 112, receiving conveyors 106, 146, secondary conveyors 142, 144, etc., described herein can comprise any form of controllable surface, such as a solid or vacuum belt on computer-controlled driven rollers, a low-friction surface accompanied by magnetic or air powered elements that move the items on the surface, etc.

The central controller 134 communicates over a wired or wireless communications network 148 or wiring harness to coordinate actions of the printing device 130, the patterning device 132, the robotic element 102, the first conveyor 112, and the receiving conveyor 106 to cause specific ones of the cut items 110 to be delivered to corresponding bins 108 based on the job of instructions.

The job of instructions comprises a single unified job, and the job of instructions can cause the printing device 130 and the patterning device 132 to produce differently printed and differently sized cut items 110 in a specific order relating to an order in which the items are to be placed in the bins 108. In this type of printing/cutting each item could contain different printing and/or be a different size from the other items. Thus, the job of instructions coordinates the actions of the printing device 130, the patterning device 132, the robotic element 102, the first conveyor 112, the secondary conveyors 142, 144 (if so equipped) and the receiving conveyor 106(s) to cause the specific ones of the cut items 110 to be delivered to the corresponding bins 108 or conveyor location is a specific order.

Figure 3:
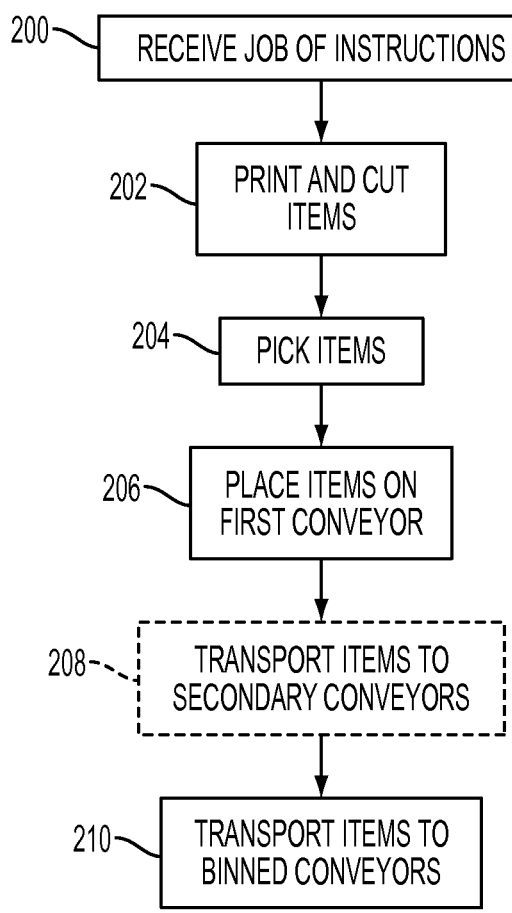
FIG. 3 is a flow diagram of various methods herein.

FIG. 3 illustrates various methods herein. In item 200, these methods receive a job of instructions into a central controller. The job of instructions comprises any type of single unified job, such as a print job, processing job, custom computer program. Further, the job of instructions can use variable information to custom print and shape each and every item that is output. Therefore, these methods cause the printing device and the patterning device to produce differently printed and differently shaped and sized cut items that are output in a specific order relating to an order in which the items are to be placed in the bins. Thus, the job of instructions coordinates the actions of the printing device, the patterning device, the robotic element, the first conveyor, the secondary conveyors (if so equipped) and the receiving conveyor(s) to cause the specific ones of the cut items to be delivered to the corresponding bins or conveyor locations (depending on what is printed on the items, what their shape is, how they will be packaged, how they will be unpacked and handled by the end user, etc.).

In item 202, these methods output printed items based on the job of instructions from the printing device and cut/pattern the printed items into cut items and output the cut items to a first location based on the job of instructions using the patterning device.

In item 204, these methods pick the cut items from the first location and, in item 206, place the cut items on a first conveyor based on the job of instructions using the robotic element. The robotic element can comprise multiple robotic elements, and the process of placing the cut items on the first conveyor in item 204 can comprise causing each of the multiple robotic elements to move different ones of the cut items from the first location to the first conveyor.

Further, such methods transport the cut items to one of the different types of receiving conveyors based on the job of instructions using the first conveyor in items 208 and 210. In certain methods herein, the first conveyor directly transports the items from the first conveyor to the receiving conveyor (skipping optional step 208). However, alternative methods herein move the first conveyor toward on-loading ends of secondary conveyors to stack, shingle, or place the cut items on the secondary conveyors based on the job of instructions in item 208. Again, the secondary conveyors are positioned at opposite ends of the first conveyor. These alternative methods also transport the cut items to multiple receiving conveyors using the second conveyors based on the job of instructions in item 210. In these methods, the receiving conveyors are adjacent offloading ends of the second conveyors.

As noted above, the receiving conveyor is operatively connected to the central controller. The receiving conveyor is adjacent the first conveyor, and the receiving conveyor contains partitions defining bins of the receiving conveyor. Additionally, such methods move the receiving conveyor to position the bins to receive specific ones of the cut items in corresponding bins based on the job of instructions.

These methods communicate over a communications network using the central controller to coordinate actions of the printing device, the patterning device, the robotic element, the first conveyor, and the receiving conveyor to cause specific ones of the cut items to be delivered to corresponding bins based on the job of instructions.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
   a printing device outputting printed items based on a job of instructions;
   a patterning device cutting said printed items into cut items and outputting said cut items to a first location based on said job of instructions;
   a robotic element picking said cut items from said first location based on said job of instructions;
   a first conveyor adjacent said first location, said robotic element placing said cut items on said first conveyor based on said job of instructions; and
   a receiving conveyor adjacent said first conveyor,
   said first conveyor transporting said cut items to said receiving conveyor based on said job of instructions, and
   said receiving conveyor moving to position said receiving conveyor to receive specific ones of said cut items in corresponding locations based on said job of instructions.

2. The system according to claim 1, said job of instructions causing said printing device and said patterning device to produce differently printed and differently sized cut items in a specific order relating to an order in which said items are to be placed on said receiving conveyor.

3. The system according to claim 1, said robotic element comprising multiple robotic elements, each of said multiple robotic elements moving different ones of said cut items from said first location to said first conveyor based on said job of instructions.

4. The system according to claim 1, said job of instructions comprising a single unified job coordinating actions of said printing device, said patterning device, said robotic element, said first conveyor, and said receiving conveyor to cause said specific ones of said cut items to be delivered to said corresponding locations.

5. The system according to claim 1, further comprising a communication network coordinating actions of said printing device, said patterning device, said robotic element, said first conveyor, and said receiving conveyor to cause said specific ones of said cut items to be delivered to said corresponding locations based on said job of instructions.

6. The system according to claim 1, further comprising a system controller receiving said job of instructions,
   said system controller being operatively connected to said printing device, said patterning device, said robotic element, said first conveyor, and said receiving conveyor, and
   said system controller coordinating actions of said printing device, said patterning device, said robotic element, said first conveyor, and said receiving conveyor to cause said specific ones of said cut items to be delivered to said corresponding locations based on said job of instructions.

7. A system comprising:
   a printing device outputting printed items based on a job of instructions;
   a patterning device cutting said printed items into cut items and outputting said cut items to a first location based on said job of instructions;
   a robotic element picking said cut items from said first location based on said job of instructions;

a first conveyor adjacent said first location, said robotic element placing said cut items on said first conveyor based on said job of instructions;

secondary conveyors positioned at opposite ends of said first conveyor, said first conveyor alternatively moving toward on-loading ends of said secondary conveyors to transport said cut items to said secondary conveyors based on said job of instructions; and receiving conveyors adjacent offloading ends of said second conveyors, said receiving conveyors containing partitions defining bins of said receiving conveyors, said second conveyors transporting said cut items to said receiving conveyors based on said job of instructions, and said receiving conveyors moving to position said bins to receive specific ones of said cut items in corresponding bins based on said job of instructions.

8. The system according to claim 7, said job of instructions causing said printing device and said patterning device to produce differently printed and differently sized cut items in a specific order relating to an order in which said items are to be placed in said bins.

9. The system according to claim 7, said robotic element comprising multiple robotic elements, each of said multiple robotic elements moving different ones of said cut items from said first location to said first conveyor based on said job of instructions.

10. The system according to claim 7, said job of instructions comprising a single unified job coordinating actions of said printing device, said patterning device, said robotic element, said first conveyor, said secondary conveyors, and said receiving conveyors to cause said specific ones of said cut items to be delivered to said corresponding bins.

11. The system according to claim 7, further comprising a communication network coordinating actions of said printing device, said patterning device, said robotic element, said first conveyor, said secondary conveyors, and said receiving conveyors to cause said specific ones of said cut items to be delivered to said corresponding bins based on said job of instructions.

12. The system according to claim 7, further comprising a system controller receiving said job of instructions, said system controller being operatively connected to said printing device, said patterning device, said robotic element, said first conveyor, said secondary conveyors, and said receiving conveyors, and said system controller coordinating actions of said printing device, said patterning device, said robotic element, said first conveyor, said secondary conveyors, and said receiving conveyors to cause said specific ones of said cut items to be delivered to said corresponding bins based on said job of instructions.

13. A method comprising:

outputting printed items based on a job of instructions from a printing device;

cutting said printed items into cut items and outputting said cut items to a first location based on said job of instructions using a patterning device;

picking said cut items from said first location and placing said cut items on a first conveyor based on said job of instructions using a robotic element, said first conveyor being adjacent said first location;

transporting said cut items to a receiving conveyor based on said job of instructions using said first conveyor, said receiving conveyor being adjacent said first conveyor; and moving said receiving conveyor to position said receiving conveyor to receive specific ones of said cut items in corresponding locations based on said job of instructions.

14. The method according to claim 13, further comprising causing said printing device and said patterning device to produce differently printed and differently sized cut items in a specific order relating to an order in which said items are to be placed on said receiving conveyor based on said job of instructions.

15. The method according to claim 13, said robotic element comprising multiple robotic elements, said method further comprising moving different ones of said cut items from said first location to said first conveyor using different ones of said multiple robotic elements.

16. The method according to claim 13, said job of instructions comprising a single unified job coordinating actions of said printing device, said patterning device, said robotic element, said first conveyor, and said receiving conveyor, and said method further comprising causing said specific ones of said cut items to be delivered to said corresponding locations based on said job of instructions.

17. The method according to claim 13, further comprising a communication network coordinating actions of said printing device, said patterning device, said robotic element, said first conveyor, and said receiving conveyor, and said method further comprising causing said specific ones of said cut items to be delivered to said corresponding locations using said communication network based on said job of instructions.

18. The method according to claim 13, further comprising a system controller receiving said job of instructions, said system controller being operatively connected to said printing device, said patterning device, said robotic element, said first conveyor, and said receiving conveyor, and said method further comprising coordinating actions of said printing device, said patterning device, said robotic element, said first conveyor, and said receiving conveyor to cause said specific ones of said cut items to be delivered to said corresponding locations using said system controller based on said job of instructions.

19. A method comprising:

outputting printed items based on a job of instructions from a printing device;

cutting said printed items into cut items and outputting said cut items to a first location based on said job of instructions using a patterning device;

picking said cut items from said first location and placing said cut items on a first conveyor based on said job of instructions using a robotic element, said first conveyor being adjacent said first location;

alternatively moving said first conveyor toward on-loading ends of secondary conveyors to transport said cut items to said secondary conveyors based on said job of instructions, said secondary conveyors being positioned at opposite ends of said first conveyor;

transporting said cut items to receiving conveyors using said second conveyors based on said job of instructions, said receiving conveyors being adjacent offloading ends of said second conveyors, said receiving conveyors containing partitions defining bins of said receiving conveyors; and moving said receiving conveyors to position said bins to receive specific ones of said cut items in corresponding bins based on said job of instructions.

20. The method according to claim 19, further comprising causing said printing device and said patterning device to produce differently printed and differently sized cut items in a specific order relating to an order in which said items are to be placed in said bins based on said job of instructions.

21. The method according to claim 19, said robotic element comprising multiple robotic elements, said method further comprising moving different ones of said cut items from said first location to said first conveyor using different ones of said multiple robotic elements.

22. The method according to claim 19, said job of instructions comprising a single unified job coordinating actions of said printing device, said patterning device, said robotic element, said first conveyor, said secondary conveyors, and said receiving conveyors, and said method further comprising causing said specific ones of said cut items to be delivered to said corresponding bins based on said job of instructions.

23. The method according to claim 19, further comprising a communication network coordinating actions of said printing device, said patterning device, said robotic element, said first conveyor, said secondary conveyors, and said receiving conveyors, and said method further comprising causing said specific ones of said cut items to be delivered to said corresponding bins using said communication network based on said job of instructions.

24. The method according to claim 19, further comprising a system controller receiving said job of instructions, said system controller being operatively connected to said printing device, said patterning device, said robotic element, said first conveyor, said secondary conveyors, and said receiving conveyors, and said method further comprising coordinating actions of said printing device, said patterning device, said robotic element, said first conveyor, said secondary conveyors, and said receiving conveyors to cause said specific ones of said cut items to be delivered to said corresponding bins using said system controller based on said job of instructions.

\* \* \* \* \*